April 22, 1952

D. C. ERDMAN 2,593,865

ULTRASONIC FLAW DETECTOR

Filed Nov. 24, 1950

INVENTOR.
Donald C. Erdman
BY
ATTORNEYS

April 22, 1952     D. C. ERDMAN     2,593,865
ULTRASONIC FLAW DETECTOR
Filed Nov. 24, 1950     3 Sheets-Sheet 2
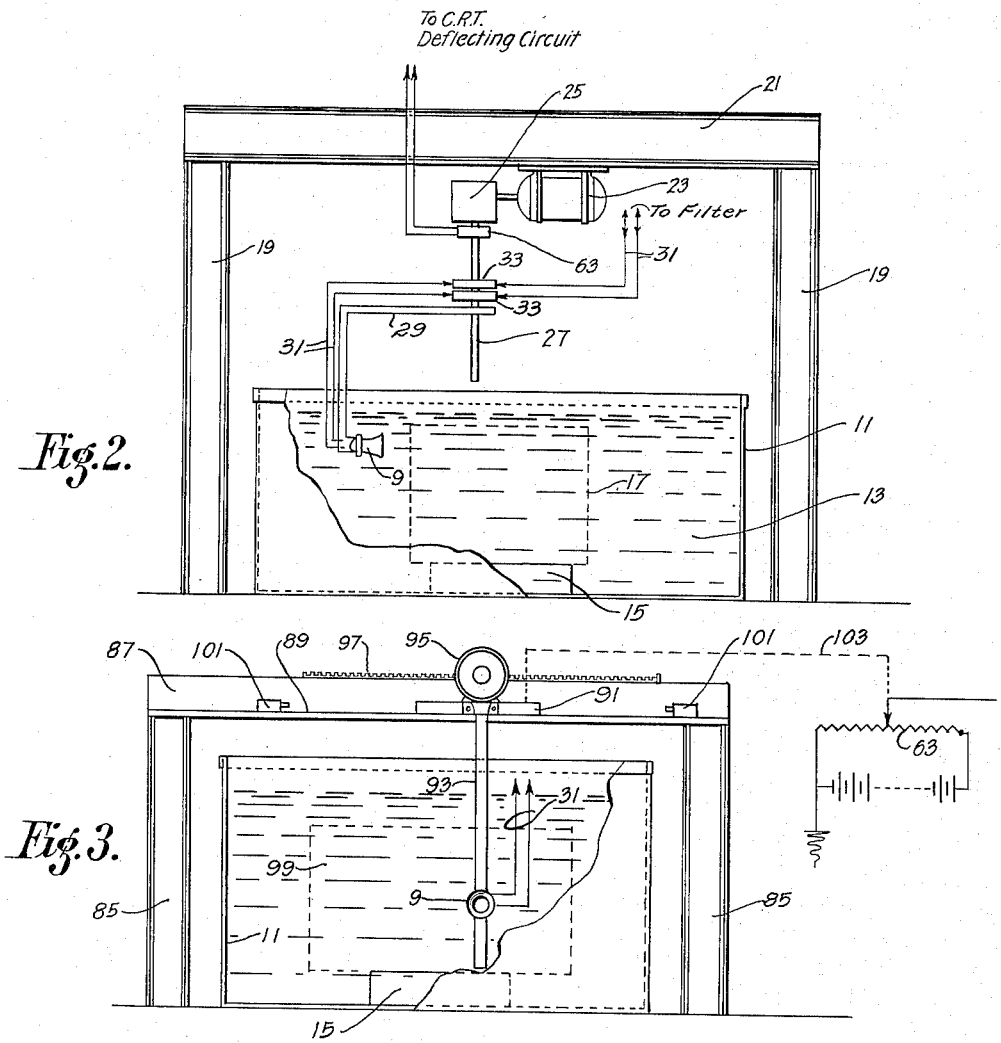
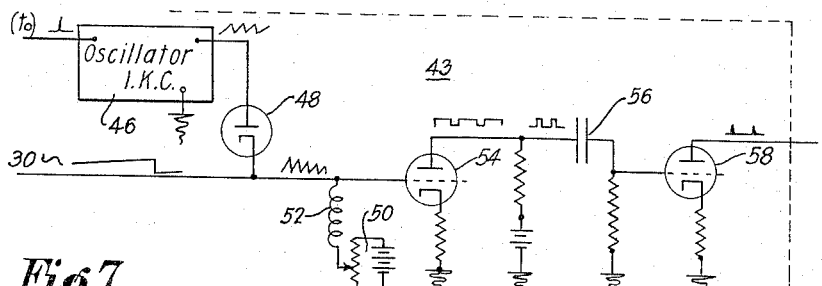
INVENTOR.
Donald C. Erdman
BY
Lippincott & Smith
ATTORNEYS April 22, 1952 D. C. ERDMAN 2,593,865
ULTRASONIC FLAW DETECTOR
Filed Nov. 24, 1950 3 Sheets-Sheet 3

INVENTOR.
Donald C. Erdman
BY Lippincott + Smith
ATTORNEYS

UNITED STATES PATENT OFFICE 2,593,865

ULTRASONIC FLAW DETECTOR

Donald C. Erdman, Burbank, Calif.

Application November 24, 1950, Serial No. 197,378

7 Claims. (Cl. 73—67)

This invention relates to apparatus for non-destructive detection of flaws such as cracks, voids, inclusions, or the like in solid materials. Specifically, it relates to a novel apparatus employing echoes of ultrasonic waves to detect such flaws, employing wave trains of material length which are frequency modulated instead of apparatus, which is now well-known, in which extremely short pulses of ultra sound are generated and their echoes detected.

In the pulse apparatus mentioned above very short pulses of elastic waves of ultrasonic frequency are generated in the sample to be tested; these pulses are propagated through the sample and upon striking any discontinuity of propagation characteristics within the sample they are reflected, at least in part, back in the direction from which they came and by measuring the interval between the emission and the reception of the pulses (the velocity of propagation within the material being tested being known) the distance of the flaw from the point of origin of the ultrasonic wave within the material can be determined. By transmitting pulses through the sample in two or more direction and noting the time of propagation between the transmission and the reception in each case the position of the flaw within the sample can be determined.

The degree of accuracy with which this can be done and, more particularly, the certainty with which flaws occurring close together or near to a surface of the sample can be distinguished is in inverse proportion to the length of the pulses used in the exploration. Since an echo occurs at any discontinuity in transmission characteristics and since such a discontinuity exists in maximum degree at the surface of the sample, a powerful reflection naturally occurs from each surface. If a flaw be located so near to a surface or to another flaw that the time of wave propagation between the two is of the order of magnitude of the length of the pulse the received echoes overlap and become difficult if not impossible to distinguish. The range resolution of such systems therefore depends upon the length of the pulses becoming poorer as such length increases. On the other hand the total amount of energy which can satisfactorily be radiated in a pulse of the character described is a direct function of the length of the pulse and the size resolution or minimum magnitude of the flaws which may be discovered by the system increases in direct proportion to the length of the pulses, since in receiving pulses of very short lengths their energy is always integrated, at least to some extent, by the receptor over the period of the pulse.

Among the objects of this invention are to provide apparatus for the non-destructive testing of materials which combines high range resolution with high size resolution; to provide an apparatus for the purpose defined which will locate graphically the position of a flaw within the sample to be tested; to provide apparatus of the character described which will automatically and systematically explore the entire sample and present to the operator thereof a succession of such graphical displays in such fashion as cumulatively to constitute a complete series of cross-sections of such sample from which the location of the flaw may be determined tridimensionally and the nature of a flaw both as to kind and dimension be accurately estimated; and to provide an apparatus of the character described which is largely automatic in operation and which requires a minimum of computation and attention in interpreting and evaluating the results of the test.

In accordance with the system of my invention the length of the trains of ultrasonic waves which are propagated through the sample has no effect upon the range resolution and these trains may be made of sufficient length so that maximum resolution of dimension may be obtained. Considered broadly, the invention involves submersing the sample to be tested in a liquid (usually water, but which may be of any character whatever so far as the method itself is concerned) and initiating the ultrasonic waves by means of a transducer also submersed in the liquid and at a material distance from the surface of the sample to be tested. The ultrasonic waves generated are preferably developed as trains whose length, as propagated through the liquid, is of the order of magnitude of the separation between the transducer and the sample; by preference the length of these wave trains should have double the distance between transducer and sample as a maximum but minimum distance of less than the single distance and even considerably less can be used with some sacrifice of efficiency in the overall system. The wave trains thus generated are frequency modulated at a constant rate, i. e., the frequency is varied, whether from a lower to a higher one or the reverse, by a prescribed number of cycles per second per second. Echoes are returned toward the transducer from the surface of the sample and from any flaws which may lie below the surface, and these echoes are picked up and converted into an electrical wave of like frequency, either by a second transducer or, preferably, by the same one which is used to radiate the waves. The received waves are then mixed with a second train of ultrasonic waves which is preferably of the same duration as the first and which is frequency modulated at the same rate, the generation of the second train, however, being delayed with respect to the first. The frequency modulations of the second train may be either in the same or in the opposite direction from that of the first wave train but there is a technical advantage in using modulation in the opposite directions; i. e., if the frequency of the first mentioned train varies from high to low throughout the train that of the second train with which the first is mixed preferably varies from low to high but both may vary either from high to low or low to high within the scope of the invention. The mixed wave trains are intermodulated to produce a modulation product which is of a constant frequency, the value of which depends upon the relative times of arrival of the initial waves of the two trains at the modulator. Thus if the two trains vary in frequency in opposite sense their sum frequency will be a constant throughout the coincident length of the trains, the sum frequency being higher if the train of ascending frequency is the first to arrive, lower if the train of descending frequency arrives first, and of a median value if they arrive simultaneously. The frequency thus produced is utilized to indicate the position of the reflecting discontinuity.

While this may be accomplished in several different ways, e. g., by measuring the frequency directly, in the preferred form of the invention the modulation products are fed to a sharply selective narrow-band-pass filter. If the two wave trains are modulated in the opposite directions this filter is designed to pass one frequency of the upper side band, that is, the sum frequency generated when the initial wave fronts of the two trains of waves reach the modulator at exactly the same instants; if the two trains are modulated in the same direction the filter is designed to select the difference frequency between the waves under the same conditions of simultaneous arrival. Since, in either case, the two wave trains are changing in frequency at the same rate it will be seen that if they arrive at the modulator other than simultaneously the result will be a different frequency developed by their intermodulation which different frequency is rejected by the filter. The chief reason for using opposite changes in frequency is that it leads to more advantageous filter design but it is not fundamental to the system.

With these facts in mind it will be seen that the particular modulation product which will be selected by the filter will be generated when and only when the delay between the instants of initiation of the first and second trains of frequency modulated waves is equal to the time required for the waves to be propagated from the transducer to a reflecting discontinuity and back to the point of pickup, and that knowing the velocity of the waves in the liquid medium wherein the sample is submersed and in the sample itself the distance from the transducer of any flaw which will return an echo can be readily ascertained.

In accordance with a feature of this invention, however, this is done automatically. A first generator of electric waves of supersonic frequency repetitively generates such trains of frequency modulated waves at regular short intervals. These waves are passed to a transducer and radiated within the liquid as has already been described. The second generator of trains of frequency modulated electrical waves is arranged to send out an equal number of wave trains of equal length, but varying amounts of delays are introduced between the time of emission of the first and the second wave trains. Preferably the amount of delay is varied electronically in accordance with a sawtooth wave, the interval between the emission of successive trains being varied by regular small increments. When the second train is delayed by an amount such that it coincides in its time of arrival at the modulator with that of an echo from some reflecting surface the resultant modulation product will pass by the filter. This modulation product is detected and is used to modulate the beam of a cathode ray tube, increasing or decreasing its intensity. Simultaneously, the same sawtooth wave which is used to vary the delay in the time of initiation of the second trains of supersonic waves is used to deflect the cathode ray beam, and the degree to which the beam has been deflected at the instant its intensity is changed is therefore a measure of the time of propagation of the initial wave to the reflecting surface and back again and hence of the distance of the reflecting surface.

Preferably the delay introduced between the emission of the first and second trains varies over a range which is wide enough to include reflections from the front and rear surfaces of the sample as well as any intermediate discontinuities, and since the reflections from the sample surfaces can readily be identified the modulation of the beam produced by a flaw will lie at distances between those produced by the front and rear surfaces which are proportional to the distances of the flaws themselves between these surfaces. Furthermore, means are provided to change the relative positions of the sample and the emitting and receiving transducer or transducers so as to scan the sample by emitted wave trains and further means deflect the cathode ray beam in a second dimension in proportion to the relative motion between the transducer and sample.

As a result there is produced upon the viewing screen of the cathode ray tube an image which is much like a television image of a cross-section of the sample, wherein the position of the points of modulation in the direction of the high frequency or "line scan" indicates to scale, the positions of the front and rear surfaces of the sample, while the deflection in the other dimension indicates the distance along the section chosen at which the flaw occurs, although not necessarily to the same scale. By shifting the relative position of sample and transducer in some other direction than that just described successive sections through the sample may be depicted, and from these successive sections the precise location of the flaw within the sample may be determined.

The directions of relative motion between sample and transducer can be varied to some degree, depending upon the nature of the samples to be investigated. For example, the relative motion between sample and transducer which is followed by the cathode ray beam may be parallel to the axis of the sample while the other motion, occurring between the portrayal of successive sections, may be linear and at right angles to the first, or it may be rotational; in the first instance the portrayal upon the cathode ray screen will be of successive parallel sections through the sample while in the second instance the sections successively portrayed would be those taken on successive transverse planes.

The invention will be more clearly understood from the following detailed description of a preferred form of the device, taken in connection with the accompanying drawings wherein:

Fig. 2 is a drawing, somewhat schematic in form, showing a tank and transducer arrangement for testing moderate sized samples of approximately circular form;

Fig. 3 is a similar diagram of the tank and transducer arrangement for testing samples which are generally flat in form;

Fig. 7 is a circuit diagram of one form of such generator.

Figure 1:
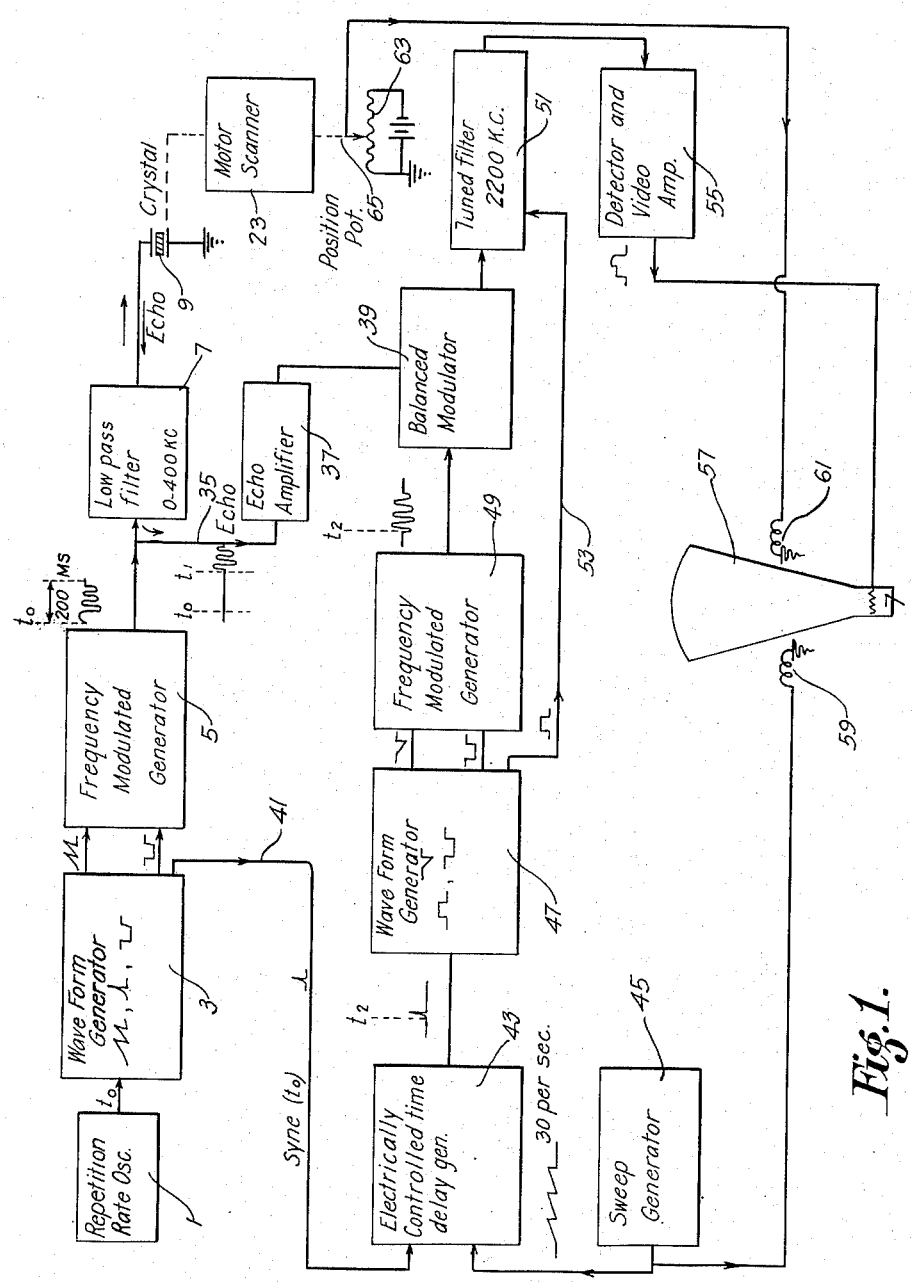
Fig. 1 is a block diagram of an organization of equipment embodying the instant invention.

Considering the block diagram of Fig. 1, in the upper left-hand corner of the diagram there is shown a repetition rate oscillator 1 which, in one form of the apparatus, operates at a frequency of about one kilocycle per second. This oscillator may be of any conventional type, developing waves either of sine or approximately rectangular form, or, in fact, any character of wave which is easy to produce. It should, of course, be relatively stable as to frequency, but as the repetition rate does not enter into the final results as delivered by the apparatus it is unnecessary to include any special frequency stabilizing devices, such as crystal controls or the like, since slight drifts in frequency will not produce any perceptible errors in the results obtained.

The output of the oscillator 1 is fed into a wave form generator 3 which produces, at the beginning of each cycle of the oscillator 1, three different waves. These waves comprise first, a short positive timing pulse which is used to control the entire operation of the equipment, second, a substantially straight-line sawtooth wave which may be triggered by the timing pulse, and third, a rectangular gating wave. The methods of generating waveforms of these various types are well known, and various methods of producing them have been described in many publications, e. g., in volume 21 of the Radiation Laboratory Series, published by McGraw-Hill and entitled "Waveforms." Since the particular apparatus used to develop such wave forms is not material to the invention at hand and various instrumentalities will produce the required results it is considered unnecessary to describe the apparatus used in detail.

Both the sawtooth wave and the gating wave produced by the generator 3 are fed into a frequency modulated wave train generator 5. This may comprise an oscillator operating at a median frequency of, say, 350 kilocycles per second. The sawtooth wave fed into the generator varies the frequency developed by it over a pre-selected range, which may be from 200 to 500 kilocycles per second, in a period of approximately 200 microseconds. As it is desired that the frequency modulation be linear it is preferable that the modulating wave be fed to two reactance tubes, one of which serves to vary the apparent inductance of the oscillating circuit while the other varies its apparent capacity; otherwise the frequency will change in accordance with a square-root law instead of linearly. An alternative to this is to use a parabolic saw tooth instead of a linear one to frequency modulate the oscillator 5, means of generating parabolic waveforms being well known.

The exact length of the wave train thus generated is controlled by the gating wave, which is of the length of the desired wave train, while the length of the saw tooth which accomplishes the frequency modulation may, if desired, have a rise time substantially equal to the repetition period. In this manner a truly linear portion of the frequency modulated wave can be selected and the changes in rate of frequency modulation occasioned by the rounding off of the corners of the sawtooth wave, which is common to almost all forms of sawtooth wave generators, may be avoided. Furthermore, the use of the gate prevents the emission of any unmodulated waves which would occur in the intervals when the sawtooth pulses are not being fed into the device.

The trains of waves produced by the generator 3 are next fed into a filter 7. This filter may be either of the low-pass variety (which is preferred because of its simplicity) or a band-pass filter. In either case the upper cutoff of the filter would, with the frequencies mentioned, be 500 kilocycles, but it may be well to state here that all of the frequency ranges mentioned in the detailed description here given are illustrative only and that in any specific piece of apparatus the frequencies used may depart very widely indeed from those given without in any way affecting the usability or accuracy of the device. There is no definite optimum as regards the frequencies which may be employed.

From the filter 7 the wave trains are passed to a transducer 9. This may be of any of the types which will respond within the frequency range to be used, the preference usually being for transducers of either the piezoelectric or the magneto-striction type.

One method of mounting the transducer is illustrated in Fig. 2. In this form of the apparatus there is provided a tank 11 which may be filled with water or other liquid 13, and which is preferably provided with a central pedestal 15 whereon a sample, whose general position is indicated by the dotted rectangle 17, may be mounted. On either side of the tank there is provided a column 19, these columns being spanned by a beam 21. The beam carries an electric motor 23, which, through a gear box 25 encasing a high-ratio step-down gear such as a worm gear, drives a vertical shaft 27. Secured to this shaft is an L-shaped arm 29 to which the transducer 9 is secured. The leads 31 from the transducer connect through slip rings 33 to and from the filter 7.

In the form of the device here shown the same transducer is used both to transmit and to receive the ultrasonic waves used in performing the task, this being desirable not only because of economy of apparatus but also because it insures that the performance characteristics of the transducing device will be the same for both transmission and reception throughout the band of frequencies employed. It is impractical (though not strictly impossible) for the transducer to exercise its two functions simultaneously, and therefore the transmission of each wave train should cease before the first echo from the sample returns.

For reasons of economy water is the liquid ordinarily employed in the tank for making the test and the speed of sound in water may be taken as approximately 5,000 feet per second. The length of the trains has been assumed as 200 microseconds, within which time an ultrasonic wave will travel one foot. Therefore, in order that the transducer may have ceased to emit each wave train before the initial waves of the train have had time to reach the sample and return the emitting surface of the transducer should be slightly over one-half foot from the nearest face of the sample. If the location of this nearer surface is not important for comparative purposes the transducer may be slightly closer, particularly if surface flaws are not important, and it can, of course, be considerably farther away. The energy in the train is, however, best utilized when the separation of transducer and near surface of the sample is just over one-half the distance which the wave train will travel within the liquid in a time equal to its length therein. In general the liquid path between the transducer and the sample should be of the same order of magnitude as the length of the wave train in the liquid.

The reflected wave train is, as indicated, picked up by the transducer 9 and passed back through the leads 31 to the filter 7. Having passed through the filter it is diverted through leads 35 to an amplifier 37 and thence to a modulator 39, preferably of the balanced type, where it is mixed with a delayed wave train developed as will next be described.

Reverting to the waveform generator 3, the timing pulse produced thereby as has previously been described is fed through a lead 41 to an electrically controlled time-delay generator 43. The time-delay generator is also fed with a sawtooth wave of relatively low frequency, which may be of the order of 30 cycles per second, developed by a generator 45 of any of the types used in cathode ray tube sweep circuits.

The time delay generator 43 is also of known type, and may take any of a number of forms which have previously been described in the literature, specifically in volume 20, Electric Time Measurements, of the Radiation Laboratory Series already referred to.

Figure 6:
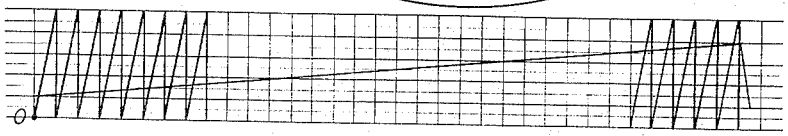
Fig. 6 is a graph showing, in somewhat idealized form, waveforms employed in one form of delay generator.

One form of such generator shown in Fig. 7, comprises a sawtooth oscillator 46 stabilized in frequency or triggered by the timing pulse. The sawtooth output of this oscillator is fed to the anode of a diode 48 in such sense that the anode becomes increasingly positive throughout the linear portion of the cycle. The 30 cycle sawtooth wave is fed in the same sense to the cathode of the diode, which is also supplied with a positive D./C. bias as indicated at 50. The diode will pass no current until the potential of the repetition-frequency saw tooth exceeds that of the 30 cycle saw tooth. As the latter potential is increasing throughout its cycle the epoch at which the diode first passes current becomes later and later in successive cycles of the repetition-frequency saw tooth. The current passed by the diode can then be fed to a differentiating circuit, e. g., an inductance 52, to produce a delayed rectangular wave of varying length. The bias on the diode determines the minimum delay; the relative amplitude of the two sawtooth waves determines the maximum delay, greater amplitudes of the 30 cycle wave introducing longer delays. With the repetition-frequency of 1 kilocycle and train length of 200 microseconds of the illustrative example given here the minimum and maximum delays should be about 200 microseconds and 800 microseconds respectively, as illustrated in Fig. 6. The rectangular pulses produced across the inductance 52 can be amplified by a tube 54, re-differentiated by a small condenser 56, and thence fed to a clipping amplifier 58 whose output is the delayed timing wave $t_2$.

The pulse issuing from the delay generator is fed to a waveform generator 47 which produces a sawtooth wave of equal length and waveform to the saw tooth produced by generator 3 but of opposite sense, plus two rectangular gating waves. The sawtooth wave and one of the gates are fed to a high frequency FM wave train generator 49, the sawtooth wave modulating the output of this generator, for example through a pair of rectance tubes, in the same manner which the ultrasonic wave from generator 5 was modulated but in opposite sense. The gating wave acts as in the previous case to cut off spurious frequencies. The gating waves from generator 47 are preferably of substantially the same length as that from the waveform generator 3, so that the wave trains produced by the two frequency modulated generators are of substantially equal length. The mid-frequency of generator 49 can have any value within a very wide range, but there is advantage in having it relatively high in comparison to that produced by the generator 5 and in the particular illustrative apparatus here described the output of generator 49 is swept from a value of 2 megacycles per second to a value of 1.7 megacycles per second.

The trains having this frequency sweep are fed into the modulator 39 where they are intermodulated with the amplified echoes from the transducer 9 to produce, among the modulation frequencies generated, a sum frequency of 2.2 megacycles per second if the delay introduced by generator 43 is equal to the propagation time of the reflected wave train to and from the sample.

It is of importance that the rate of frequency change in wave trains generated by the oscillator 49 be equal and opposite to the rate of change of those from the generator 5.

If the delay produced by the generator 43 has some other value than the echo delay the sum frequency developed by the modulator 39 will be different; thus if the delay in the second wave train is 100 microseconds less than the echo delay the frequency of the second train will have fallen from a value of 2 megacycles to 1.85 megacycles when the echo train arrives, and the resulting sum frequency will be 2.05 megacycles instead of 2.2 megacycles. If, on the other hand, the delay of the second wave train be greater than that of the echo delay by 100 microseconds the frequency of the echo train will have risen to .35 megacycles at the initial instant of the second wave train and the sum frequency developed will therefore be 2.35 megacycles instead of 2.2. In either case the two trains will overlap for only half of their length and therefore the sum frequency will be generated for a shorter length of time in addition to deviating from its desired value. If the delays differ by 200 microseconds or more there will be no coincidence and no sum frequency will be generated.

The output of the modulator 39 is fed to a very sharply tuned filter 51, which may conveniently take the form of a sharply tuned amplifier. This filter is tuned to the 2.2 megacycle frequency which corresponds to coincidence in time of the two wave trains, so that it excludes all frequencies generated when the two waves do not coincide. As an additional precaution it may be fed with the second gating wave from the generator 47 through channel 53. This serves to cut off any spurious frequencies which might pass through the filters during the time when the oscillator 49 is not in operation and so act to increase the noise level in the device.

The output of filter 51 feeds a detector and video amplifier 55 which, in turn, feeds the control grid of a cathode ray tube 57. The latter tube preferably approaches more nearly the type used for radar operation than that customary in television in that it is provided with a luminescent screen of the persistent type which will hold a trace for a period of several seconds. This is not an essential feature, however, and short period screens may be used if desired.

The cathode ray tube 57 is provided with the usual bidimensional deflecting means which may be either magnetic or electrical though usually the former will be used. One set of deflecting coils 59 is fed by sawtooth waves from the generator 45; the same waves which are used to control the delay in the generator 43. The other set of deflecting coils 61 are fed by potentials from a potentiometer 63, the pickup arm 65 of which is mounted on the shaft 27 which controls the motion of the transducer 9.

The deflection of the beam in one direction therefore corresponds to the position of the transducer in one dimension. The deflection of the beam in the other direction corresponds to the epoch of the 30 cycle sawtooth wave in which the two wave trains coincide and is therefore proportional to the time required by the ultrasonic waves in the tank 11 to reach a discontinuity in the sample 17 and return to the transducer. When a modulation of the beam occurs, causing a change in luminosity of the target screen of the cathode ray tube, the position of the trace upon the screen where the modulation appears corresponds in one dimension to the circumferential position of the transducer with respect to the sample and in the other dimension to the distance from the transducer to a reflecting surface.

There will be many trains of waves generated in each cycle of the higher frequency sweep; in the present instance 33⅓. Each train will be delayed slightly longer than the next preceding one, so that effectively the waves entering the sample can be considered as a probe which explores the sample to increasingly greater depths at each successive train throughout each thirtieth of a second. Since the trains are not initiated at the same phase of the 30-cycle sweep in successive cycles, and flaws are customarily of greater magnitude than would affect only a single sweep, the resolution in this case would be about 100 points on the sample.

In the meantime the transducer has rotated by a small amount which is represented by the displacement of the next line of the sweep of the cathode ray tube, and by the time the transducer has made a complete rotation, carrying with it the arm of the potentiometer, there has been depicted upon the viewing surface of the tube what is essentially a developed transverse section of the sample. After each completed revolution of the transducer about the sample it may be moved vertically by some small increment and another transverse section depicted. Such vertical movement can readily be done either manually or automatically.

As has been indicated, the spacing of the wave trains and their length should be such that both the front and rear surfaces of the sample are shown on the screen, since in this case it becomes unnecessary to know the exact speed of propagation of the ultrasonic waves within the sample, the distance of the indication of any flaw between the indications of the front and rear surfaces being a matter of direct proportion. In case the exact speed of propagation is known it is unnecessary that the rear surface be shown and the timing of the pulses may be adjusted so that each sweep only represents a radius of the sample instead of the entire diameter thereof.

Furthermore, as has already been mentioned, none of the frequencies here given as illustrative is critical. The repetition frequency of the sawtooth scanning and delay generating wave and their slopes may be so adjusted as to give any desired degree of range resolution and the frequency sweep of the FM wave trains can be adjusted to give any size resolution desired. The length of the wave trains is also under control and this, taken in connection with the repetition frequency with which they are emitted, can be adjusted so that echoes from the sides of the tank itself do not enter into the picture to confuse the results. Echoes from the far side of the tank are, of course, very strong and although they are attenuated in some degree by their distance from the transducer, the percent of reflection may be very much greater than that caused by a small flaw within the sample. Because of the large difference in their times of arrival, however, by varying the various parameters entering into the operation of the device any adverse effects which tank echoes might cause can be totally avoided.

Experience has indicated that although refraction as well as reflection will occur when the waves strike the sample other than normally to its surface, the effects produced can be compensated for in reading the cathode ray screen and the images developed thereon can be satisfactorily interpreted. If there are large irregularities in the thickness of the sample at different points of its surface there will be some distortion in the cross-section shown, but again the distances are proportional along any one sweep of the cathode ray tube and these distortions can also be eliminated from the computations.

Figure 4:
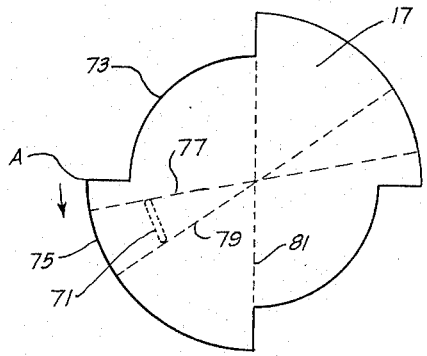
Fig. 4 is a plan view of a hypothetical sample.
Figure 5:
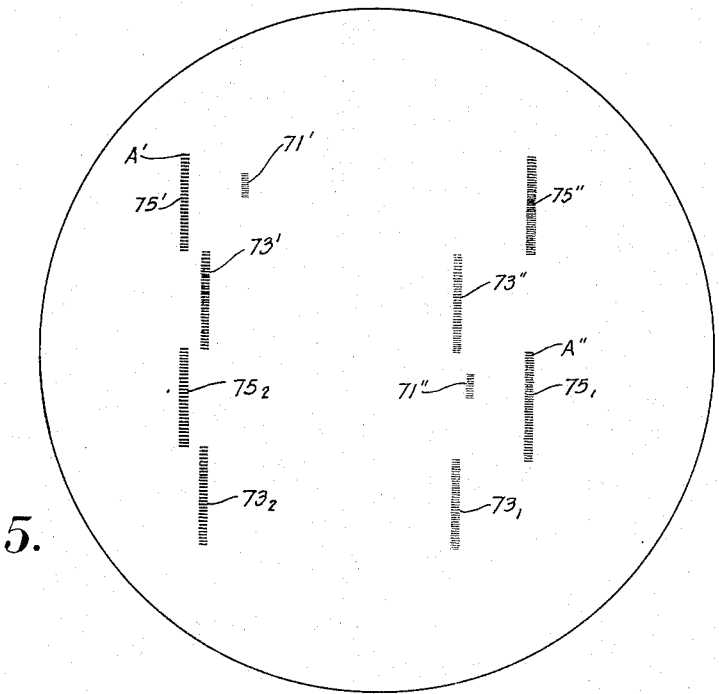
Fig. 5 is a showing of the appearance of the face of a cathode ray tube displaying test data on the sample of Fig. 4.

This will be better understood from an inspection of Figs. 4 and 5. The first of these is a plan view of a hypothetical sample 17 to be tested, having within it a flaw (indicated by the dotted lines 71) extending through the horizontal plane in which scanning is taking place. The sample is assumed to be generally cylindrical in section, having alternate quadrants 73 and 75 of smaller and larger radius respectively. The scanning is assumed to start at the point A, and the rotation of the transducer 9 to be in a counterclockwise direction. It may be assumed, for the purposes of illustration, that the sample is of wood or some other material in which the velocity of propagation of the supersonic wave trains is low, i. e., half that in the water in which it is immersed.

Fig. 5 indicates the appearance of the fluorescent target of the cathode ray tube in one complete circular scanning of the sample. For the sake of simplicity this is shown in negative, the dark lines in the drawing indicating what would actually be bright lines on the tube face. Each echo which is accepted by the filter appears as a bright dot, or rather as short dash; it takes 1/30 second to complete one sweep and with 200 microsecond pulse trains these short dashes would each be .006 times the length of the sweep; with a ten inch sweep they would be just under a sixteenth of an inch long. This is somewhat exaggerated in the drawing.

At the start of the scanning, as indicated at the top of the sweep, the only reflections are those from the front and rear surfaces of the sample, as indicated by the vertical rows of short dashes 75' and 75" respectively. As the scanning progresses, counterclockwise of the sample, and reaches a position along the extension of the diameter 77, reflections from the flaw 71 start to come in, as indicated at 71' of Fig. 5, continuing to be received until the transducer is on a line with the diameter 79. Thereafter only the front and rear reflections are received, these reflections continuing along the vertical lines 75' and 75" until the transducer reaches a position in the plane of diameter 81 of Fig. 4. At this point the trace moves to the right, to the position 73', corresponding to the reduction in diameter of the sample. Because of the assumed difference of velocity of the waves in the liquid and the sample the echo is received at the transducer at an earlier time than it would be had it had to traverse an equal distance through the sample material and therefore the reflections 73' move relatively to the left. The relative times taken for the echoes to traverse the total diameter of the sample are, however, still proportional to that diameter; the reflections 73" therefore move a still greater distance to the left, as is shown. As the transducer continues to rotate the point is reached where the point A of Fig. 4 becomes the rear surface, as is indicated by the point A" of Fig. 5, and shortly thereafter the echo from the flaw 71 appears again on the screen as is indicated at 71". Thereafter the scanning is continued as before until the rotation is complete, whereafter it can be repeated, if desired, at either the same or a lower level within the tank.

As was indicated above it is not necessary that the scanning be rotary. Testing of this character is normally economically justified only when a large number of similar samples are to be examined and the mechanical portions of the equipment will therefore customarily be designed to meet the specific requirements of the samples to be tested. In Fig. 3 there is shown, in highly diagrammatic form, an arrangement for examining samples which are generally in the form of flat plates or slabs. The arrangement of tank, pedestal, and the electrical system, as far as it concerns the generation and recognition of the exploratory wave trains, is identical with those already described and is identified in the figure by the same reference characters.

The mechanical equipment can conveniently be mounted, as before, on an overhead frame comprising columns 85 supporting a transverse girder 87. This girder carries a set of horizontal ways or tracks 89, on which a carriage 91 is slidably mounted. Secured to this carriage is a downwardly projecting arm 93 for supporting the transducer 9.

Mounted on the carriage is a drive-motor 95, the shaft of which carries a gear (not shown) for engaging a rack 97, so that rotation of the motor will traverse the carriage 91 along the ways to accomplish lateral scanning of the sample, which is placed as indicated by the dotted rectangle 99.

Limit switches 101 are provided on the track 89. These are arranged to reverse the motor 95 as it reaches the end of its travel. The electrical connections accomplishing this are not shown since they are well known and their inclusion would only confuse the diagram.

A mechanical connection, indicated schematically by the dotted line 103, connects the carriage 91 with the movable arm of the position potentiometer 63. Again there are so many ways of accomplishing this that it appears unnecessary to indicate them in detail, as they are no part of the present invention.

With this arrangement the appearance of the viewing screen of the oscilloscope is very much the same as that where the scanning arrangement first described is used, due allowance being made, of course, for the different shape of the sample, There is, however, the difference that when one vertical scanning traverse has been completed, by the carriage 91 having made the trips, say, from left to right thus moving the beam vertically from top to bottom of the screen, the next traversal will be in the opposite direction and the scanning as shown upon the oscilloscope will occur from bottom to top of the screen.

As has been indicated above the individual electrical elements of the system here described are subject to wide variations and the mechanical elements will almost necessarily differ from installation to installation. The specific equipment described is therefore to be considered as illustrative merely of the invention as defined by the following claims.

I claim:

1. An ultrasonic flaw detector comprising a tank for holding a liquid wherein a sample to be tested may be submersed, an electro-ultrasonic transducer mounted within said tank and spaced from the position therein normally occupied by said sample, means for generating trains of electric waves of ultrasonic frequency varying with time at a substantially constant rate, connections for applying said waves to excite said transducer to produce corresponding ultrasonic wave trains therefrom, the length of said wave trains in said liquid being of the order of magnitude of the spacing between said transducer and said sample, means for generating additional electrical wave trains of substantially equal length to said first mentioned trains and varying in frequency at substantially the same rate, a modulator, input connections to said modulator from said additional generating means and said transducer, a narrow bandpass filter fed by said modulator to select from the output thereof a modulation product of specific and constant frequency, means for delaying the instants of initiation of said second mentioned wave trains by varying determinable amounts to vary the frequency of the modulation products produced by echoes of said first mentioned wave trains and said second mentioned wave trains, means connected to the output of said filter for indicating the presence of said selected modulation product, and means for indicating the magnitude of relative delay in the initiation of said second wave train when producing said selected modulation product, said indications jointly indicating the depth within said sample of a discontinuity therein.

2. Apparatus in accordance with claim 1 wherein said second wave train is varied in frequency in opposite sense from said first wave train, and said band-pass filter is selective of a sum frequency producible by the intermodulation of said wave trains.

3. Apparatus in accordance with claim 1 wherein said indicating means comprises a cathode ray tube including means for producing a beam of cathode rays, means for modulating the intensity of said beam and means for deflecting said beam across a luminescent screen; connections from said filter to said beam modulating means, and means for producing a deflection of said beam in proportion to the delay between said wave trains.

4. Apparatus in accordance with claim 1 wherein said indicating means comprises a cathode ray tube including means for producing a beam of cathode rays, means for modulating the intensity of said beam and means for deflecting said beam across a luminescent screen in two dimensions; connections from said filter to said beam modulating means, means for producing a deflection of said beam in one dimension in proportion to the delay between said wave trains, means for producing relative motion between said sample and said transducer to cause waves emitted by said transducer to scan said sample, and means for producing a deflection of said beam in a second dimension in proportion to said relative motion.

5. An ultrasonic flaw detector comprising a tank for holding a liquid wherein a sample to be tested may be submersed, an electro-ultrasonic transducer mounted within said tank and spaced from the position therein normally occupied by said sample, means for generating periodically repeated trains of electric waves of ultrasonic frequency varying with time at a substantially constant rate, connections for applying said waves to excite said transducer to produce corresponding ultrasonic wave trains therefrom, the length of said wave trains in said liquid being of the order of magnitude of the spacing between said transducer and said sample, means for generating additional electrical wave trains of substantially equal length to said first mentioned trains and varying in frequency at substantially the same rate, a modulator, input connections to said modulator from said additional generating means and said transducer, a narrow band-pass filter fed by said modulator to select from the output thereof a modulation product of specific and constant frequency, a generator of sawtooth waves of a frequency low in comparison with the frequency of repetition of said wave trains, means for triggering said additional generating means at a time following the generation of said first mentioned wave train and responsive to the instantaneous value of said sawtooth wave to delay such triggering for a time period depending on said value, a cathode ray tube having means for generating a beam of cathode rays, means for modulating the intensity of said beam and means for deflecting said beam, connections from said filter to said beam modulating means and connections from said sawtooth wave generator to said deflecting means, whereby the degree of deflection of said beam when modulated by waves selected by said filter is a measure of the delay in generation of said second mentioned wave train required to produce the modulation product selected thereby.

6. Apparatus in accordance with claim 5 including means for producing relative motion between said transducer and said sample to produce scanning of the latter by said ultrasonic wave trains, and means for deflecting said cathode ray beam in a second direction to a degree dependent on the relative positions of said sample and said transducer.

7. Apparatus in accordance with claim 5 wherein the frequency variation of said first and second mentioned wave trains is in opposite directions and said filter is selective of substantially the minimum sum frequency producible by intermodulation of said frequencies.

DONALD C. ERDMAN.

REFERENCES CITED

The following references are of record in the file of this patent:

UNITED STATES PATENTS

| Number | Name | Date |
|---|---|---|
| 2,275,735 | Cloud | Mar. 10, 1942 |
| 2,557,864 | Doremus | June 19, 1951 |